M. BALCKER.
SAUSAGE STUFFER.
APPLICATION FILED MAR. 7, 1912.

1,054,633.

Patented Feb. 25, 1913.

3 SHEETS—SHEET 1.

Witnesses
O. M. Wernich
E. Newstrom

Inventor
Martin Balcker
by Chas. C. Tillman Atty.

M. BALCKER.
SAUSAGE STUFFER.
APPLICATION FILED MAR. 7, 1912.

1,054,633.

Patented Feb. 25, 1913.

3 SHEETS—SHEET 2.

Witnesses
O. M. Hemrich
E. Newstrom

Inventor
Martin Balcker
by Chas. C. Tillman
Atty.

M. BALCKER.
SAUSAGE STUFFER.
APPLICATION FILED MAR. 7, 1912.

1,054,633.

Patented Feb. 25, 1913.

3 SHEETS—SHEET 3.

Witnesses
O. M. Wemich
E. Newstrom

Inventor
Martin Balcker
by Chas. C. Tillman Atty.

UNITED STATES PATENT OFFICE.

MARTIN BALCKER, OF CHICAGO, ILLINOIS, ASSIGNOR TO BLOMFELDT AND RAPP COMPANY, OF CHICAGO, ILLINOIS, A CORPORATION OF ILLINOIS.

SAUSAGE-STUFFER.

1,054,633.   Specification of Letters Patent.   Patented Feb. 25, 1913.

Application filed March 7, 1912. Serial No. 682,193.

*To all whom it may concern:*

Be it known that I, MARTIN BALCKER, a subject of the King of Sweden, residing at Chicago, in the county of Cook and State of Illinois, have invented certain new and useful Improvements in Sausage-Stuffers, of which the following is a specification.

This invention relates to improvements in that type of sausage stuffing machines in which pneumatic pressure is employed to actuate a movable piston located in a cylinder separated from the meat containing cylinder or receptacle, for the purpose of forcing the contents of the last named cylinder or receptacle out through a nozzle or nozzles into casings in the ordinary manner, and it consists in certain peculiarities of the construction, novel arrangement, combination and operation of the various parts thereof as will be hereinafter more fully set forth and specifically claimed.

The principal object of the invention is to provide an electrically driven or operated pneumatic stuffer, which shall be simple and inexpensive in construction, compact in form, strong, durable, and efficient in operation, and so made as to be substantially non-heating, sanitary, and of easy operation.

Another object of the invention is to furnish a sausage stuffer in which the cylinder which carries the piston for operating the plunger of the meat receptacle, is detached or separated therefrom, to the end, that the compressed air employed for actuating the piston and thereby operating the plunger cannot escape and be forced into the meat.

Various other objects and advantages of the invention will be disclosed in the subjoined description and explanation.

In order to enable others skilled in the art to which the invention pertains, to make and use the same I will now proceed to describe it referring to the accompanying drawings in which—

Figure 1:
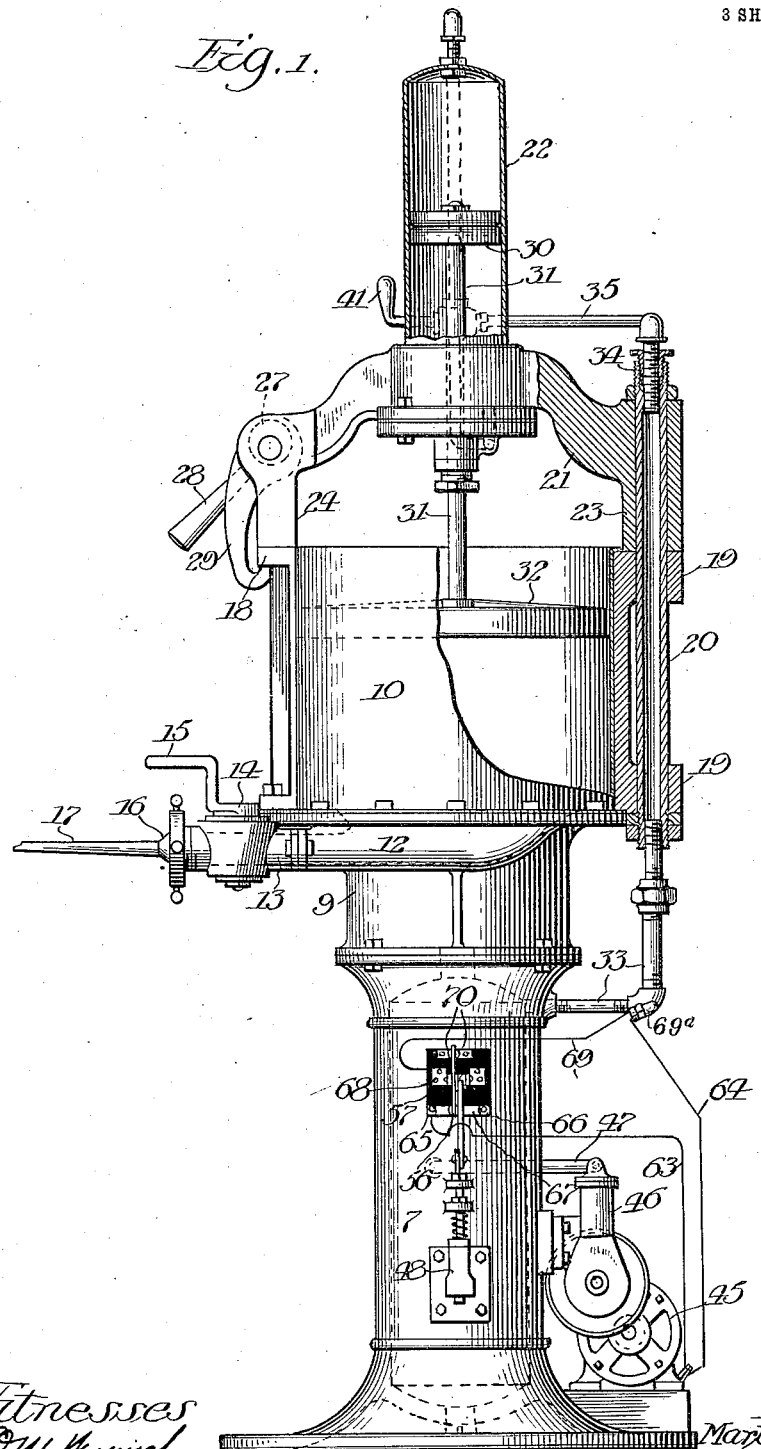
Figure 2:
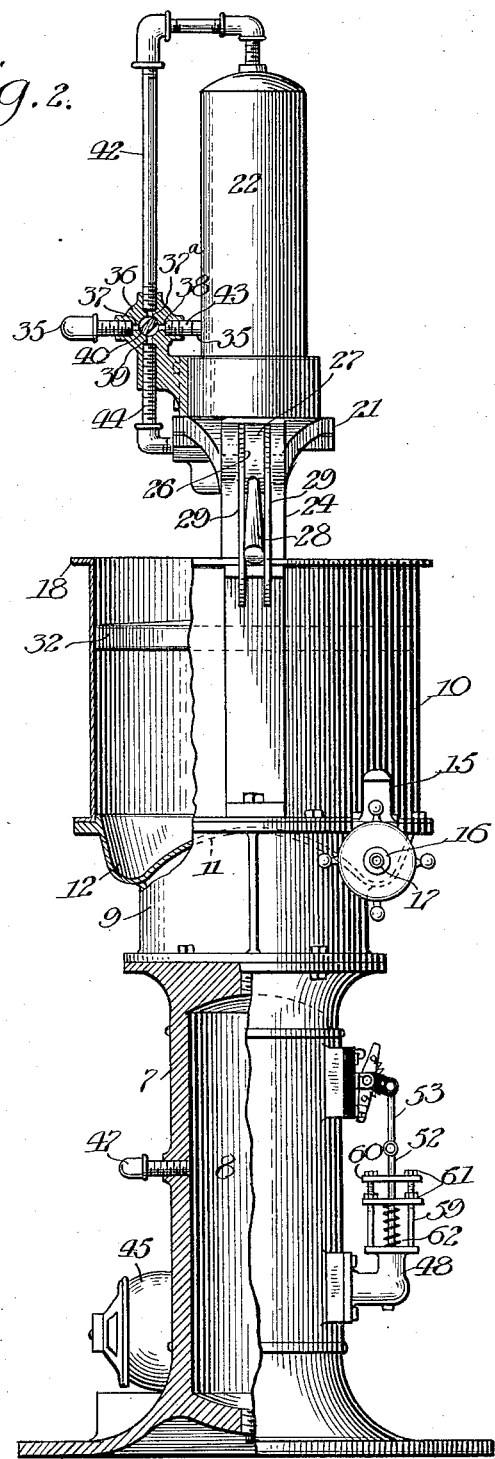
Figure 3:
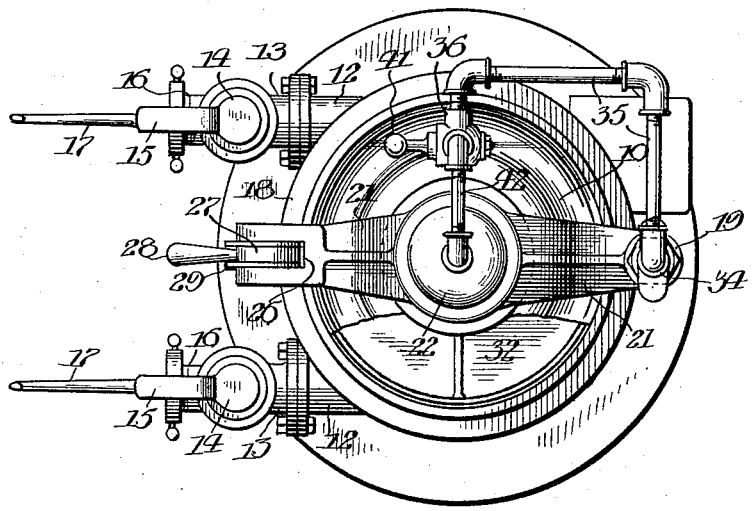
Figure 4:
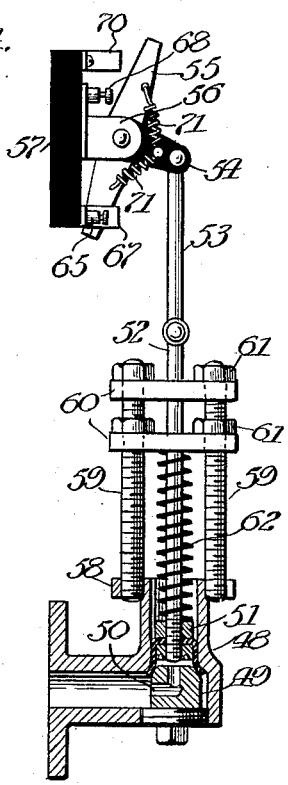

Figure 1, is a side view partly in section and partly in elevation of a sausage stuffing machine embodying the invention. Fig. 2, is a front view thereof partly in section and partly in elevation. Fig. 3, is a plan view, and Fig. 4, is a detached view partly in section and partly in elevation of the automatic controlling mechanism for the electric motor of the machine.

Like numerals of reference refer to corresponding parts throughout the different views of the drawings.

The reference numeral 7, designates the base or support of the apparatus, which may be made of any suitable size, form and material, but preferably of metal, and cylindrical in shape as shown. This base or support is provided with a cavity 8, to act as a reservoir for compressed air and has mounted on its upper portion the base 9, of the meat containing receptacle 10, which is preferably cylindrical in shape as shown, and has its upper end open for the reception of the sausage meat when the plunger of said receptacle is raised. The bottom of the receptacle 10, which is formed by the upper portion of the base 9, is elevated as at 11, (see Fig. 2) so as to extend diametrically of the receptacle 10, from its front portion rearwardly, thus forming on each side of said elevated portion a trough 12, the front portions of which are extended in tubular form in front of the receptacle 10, and each has secured thereto one end of a tube or pipe 13, each of which is provided with a valve 14, having a handle 15, to be used for opening and closing said pipes or tubes. Fitted on the outer end of each of the pipes or tubes 13, by means of a suitable coupling 16, is a nozzle 17, on which the casings for the reception of the sausage meat may be placed in the process of filling the same. The receptacle 10, is provided at its upper portion with an outwardly extended annular flange 18, and on its rear portion with vertically apertured bosses 19, which are located one above the other and are for the reception of a pipe 20, which extends some distance above the upper portion of the receptacle 10, and affords a journal or bearing for a supporting yoke 21, for the piston cylinder 22, of the apparatus. As shown in Figs. 2, and 3, of the drawings, the yoke 21, is extended diametrically over the upper portion of the receptacle 10, and has at one of its ends a vertical hollow portion 23, through which the pipe 20, is extended thus affording means for permitting the yoke 21, and its cylinder 22, to be turned to either side of the receptacle 10, after its plunger has been raised therefrom, for the purpose of allowing meat to be placed in said receptacle, and also, that the same may be cleaned when desired. The opposite end of the yoke 21, is provided with a downward extension 24, which is adapted to rest at its lower end on the rim of the receptacle 10, and is provided in its upper outer portion with a recess 26, for the reception of an eccentric 27, which is journaled in said recess and has a handle 28, extended therefrom for the purpose of operating the same. Surrounding the eccentric 27, at their upper ends are a pair of downwardly extended hooked arms 29, which have their lower ends forced into engagement with the flange 18, on the receptacle 10, by means of the eccentric 27, and its handle 28, thus firmly securing the yoke 21, in position on said receptacle, yet in such a manner that it can be released so that it may be turned to either side of the receptacle. Movably located in the cylinder 22, is a piston 30, from which a rod 31, is extended downwardly through said cylinder and the yoke 21, and is connected at its lower end to a plunger 32, which is snugly fitted in the receptacle 10, yet so as to move up and down therein.

Communicating at one of its ends with the upper portion of the air reservoir 8, is a pipe 33, which communicates at its other end with the lower end of the pipe 20, on the upper portion of which is fitted by means of a suitable stuffing box 34, one end of a pipe 35, which is connected at its other end to a valve casing 36, which is mounted on the yoke 21, at one side of the cylinder 22, and as is clearly shown in Fig. 2, of the drawings, and has four ways or ports 37, 37ª, 38, and 39, for the passage of fluid into and from the piston cylinder. The casing 36, is provided with a valve 40, which has a handle 41, used for turning the same. Leading from the way or port 37ª, of the valve casing 36, to the upper portion of the cylinder 22, is a pipe 42, and leading from the port 38, of said casing, is another pipe 43, which terminates at its other end externally of the cylinder 22, and is for the exhaust of motive fluid. Leading from the port 39, of the casing 36, is a pipe 44, which communicates at its lower end with the lower portion of the cylinder 22, and is for the supply of motive fluid to said cylinder when it is desired that the piston 30, thereof and the plunger 32, of the meat receptacle 10, shall be raised. Mounted on the lower portion of the base or support 7, of the machine, is an electric motor 45, of the ordinary or any preferred construction which may have electric connection with any suitable source of electric energy, not shown, and which motor is geared in any suitable manner to a compression pump 46, of the ordinary or any preferred construction, which pump is suitably mounted on the support 7, near the motor 45, and has communication through a pipe 47, with the air reservoir. Mounted on the lower portion of the support 7, and communicating with the air reservoir 8, thereof is a small cylinder 48, in an opening in the lower portion of which is fitted a plug 49, which has a passageway 50, leading from the said cylinder toward the air reservoir. Movably located in the cylinder 48, is a plunger 51, from which has extended upwardly a rod 52, which is pivotally connected at its upper end to the lower end of a link 53, which link is similarly connected at its upper end to an arm of insulation 54, on a switch knife 55, which is pivotally mounted on a bracket 56, mounted on a plate or piece 57, of insulation which piece is suitably secured to the support 7, at a desired point above the cylinder 48. As is clearly shown in Fig. 4, of the drawings, the cylinder 48, is provided at its upper end with a flange 58, in suitable openings in which are fitted screw bolts 59, which are connected together at their upper portions by means of cross bars 60, which can be adjusted on said bolts by means of nuts 61. Each of the bars 60, is provided between its ends with an opening through which the rod 52, is loosely extended. Surrounding the rod 52, is a coiled spring 62, which rests at one of its ends against the plunger 51, and at its other end against one of the bars 60, by means of which bar the tension of said spring may be regulated as is obvious.

Mounted on the pipe 33, is a plug 69ª, which plug is adapted to engage a socket, not shown, having electric connection with a supply of electricity. Leading from the plug 69ª, are two conductors 64, and 69, the conductor 64, running to the motor 45, while the conductor 69, is connected to the member 68, of the switch. Also leading from the motor 45, is another conductor 63, which runs to the opposite side of said switch and is connected to the binding post 65, thereof, so that when the blade 55, is brought in contact with the member 67, the circuit will be completed to start the motor. Mounted on the upper portion of the plate 57, is a pair of parallel guides 70, between which the upper portion of the knife 55, will fit when its lower portion is thrown out of contact with the contact member 67, which operation will take place when the air pressure within the air reservoir 8, has reached a predetermined degree, for it is evident that its pressure is exerted on the plunger 51, the latter will be raised thereby, thus forcing the rod 52, and link 53, upwardly so as to cause the knife 55, to be tilted on its pivot and its lower portion thrown out of contact with the members 67, thus breaking the circuit. In this operation, the knife 55, will be given quick movement by means of the springs 71, which are connected at one of their ends to the knife and at their other ends to the arm 54, of insulating material. As soon as the pressure within the reservoir is sufficiently decreased it is manifest that the spring 62, will force the plunger 51, downwardly and through its connections with the knife 55, will throw it into contact with the members 67, thus completing the electric circuit and setting the motor and compression pump in operation.

When it is desired to place meat within the receptacle 10, it is obvious that the hooks 29, may be released from the flange 18, by raising the handle 28, on the eccentric 27, when, if the plunger 32, has been raised from the receptacle 10, it is evident that the yoke 21, carrying the cylinder 22, can be turned to one side of said receptacle, thus leaving the latter open and free of access. After sufficient quantity of meat has been placed in the receptacle the yoke may be turned to its normal position and fastened by means of the hooks 29, when, assuming that the valve 41, is in the position shown in Fig. 2, of the drawings, it is apparent that compressed air will pass through the pipe 42, and drive the piston 30, and plunger 32, downwardly, in which operation the air in the lower portion of the cylinder 22, will be exhausted through the pipes 44, and 43. When it is desired to raise the piston the valve 40, should be turned from the position shown in Fig. 2, so that it will rest between the ports 36, 37, and ports 38, and 39, when it is obvious that compressed air will be supplied to the cylinder 22, through the pipe 44, and exhausted through the pipes 42, and 43, from the upper portion of said cylinder.

In order that the knife switch 55, may have a quick action when it is withdrawn from between the contact members 67, so as to prevent sparking, the arm 54, and knife 55, are mounted independently of each other on the pivot for the same.

Having thus fully described my invention what I claim as new and desire to secure by Letters-Patent is—

1. In a sausage stuffer, the combination with a supporting base having a reservoir therein, of a meat receptacle mounted on said base and having at its lower portion one or more discharge openings, of a pipe vertically supported externally of the meat receptacle and projecting above the same, a pipe section communicating at one of its ends with said reservoir and at its other end with the pipe on said receptacle, a supporting yoke journaled near one of its ends on the upper portion of the last named pipe for lateral movement and having at its other end means to detachably engage the upper portion of the meat receptacle, a motive fluid cylinder mounted on said yoke, a piston movably mounted in said cylinder, a piston rod connected at its upper portion to said piston and extended through the lower portion of said cylinder, a plunger on the lower portion of said rod to fit in the meat receptacle, a valved pipe communicating at one of its ends with the upper portion of the pipe on the meat receptacle and at its other end with the upper and lower portions of said cylinder, and electrically controlled means for supplying compressed air to said reservoir.

2. In a sausage stuffer, the combination with a supporting base having a reservoir therein, of a meat receptacle mounted on said base and having at its lower portion one or more discharge openings, of a pipe vertically supported externally of the meat receptacle and projecting above the same, a pipe section communicating at one of its ends with said reservoir and at its other end with the pipe of said receptacle, a supporting yoke journaled near one of its ends on the upper portion of the last named pipe for lateral movement and having at its other end means to detachably engage the upper portion of the meat receptacle, a motive fluid cylinder mounted on said yoke, a piston movably mounted in said cylinder, a piston rod connected at its upper portion to said piston and extended through the lower portion of said cylinder, a plunger on the lower portion of said rod to fit in the meat receptacle, a four-way valve casing mounted on the yoke adjacent to said cylinder and having communication with the upper and lower portions of the latter, a pipe connected at one of its ends to said valve casing and rotatably connected at its other end to the upper portion of the pipe on the meat receptacle, a valve in said casing, an electrically operated compressor communicating with said reservoir, and means actuated by the pressure in said reservoir to stop the operation of the said compressor.

3. In a sausage stuffer, the combination with a suitably supported meat receptacle having at its lower portion one or more discharge openings and provided on its wall with one or more apertured projections, of a pipe located in said projections and having communication at its lower end with a supply of motive fluid and extended at its upper portion above the meat receptacle, a supporting yoke journaled near one of its ends on the upper portion of said pipe for lateral movement, a motive fluid cylinder mounted on said yoke, a piston movably mounted in said cylinder, a piston rod connected at its upper portion to said piston and extended through the lower portion of said cylinder, a plunger on the lower portion of said rod to fit in the meat receptacle, a valved pipe communicating at one of its ends with the upper portion of the pipe on the meat receptacle and at its other end with the upper and lower portions of said cylinder, and electrically operated and controlled means for supplying motive fluid through said pipes.

MARTIN BALCKER.

Witnesses:
CHAS. C. TILLMAN,
E. NEWSTROM.

Copies of this patent may be obtained for five cents each, by addressing the "Commissioner of Patents, Washington, D. C."